United States Patent
Hua et al.

(10) Patent No.: US 9,959,001 B2
(45) Date of Patent: May 1, 2018

(54) TOUCH SUBSTRATE, METHOD FOR MANUFACTURING THE SAME AND TOUCH DEVICE

(71) Applicants: BOE Technology Group Co., Ltd., Beijing (CN); Hefei Boe Optoelectronics Technology Co., Ltd., Anhui (CN)

(72) Inventors: Lei Hua, Beijing (CN); Jian He, Beijing (CN); Site Cai, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days. days.

(21) Appl. No.: 15/515,291

(22) PCT Filed: Jul. 27, 2016

(86) PCT No.: PCT/CN2016/091828
§ 371 (c)(1),
(2) Date: Mar. 29, 2017

(87) PCT Pub. No.: WO2017/117981
PCT Pub. Date: Jul. 13, 2017

(65) Prior Publication Data
US 2018/0088703 A1 Mar. 29, 2018

(30) Foreign Application Priority Data
Jan. 6, 2016 (CN) .......................... 2016 1 0007258

(51) Int. Cl.
*G06F 3/041* (2006.01)
*G06F 3/044* (2006.01)

(52) U.S. Cl.
CPC .... *G06F 3/044* (2013.01); *G06F 2203/04112* (2013.01)

(58) Field of Classification Search
CPC ....................... G06F 3/044; G06F 2203/04112
See application file for complete search history.

(56) References Cited

U.S. PATENT DOCUMENTS 9,141,241 B2 * 9/2015 Huang .................... G06F 3/044
9,389,258 B2 * 7/2016 Kravets .................. G06F 3/044
9,542,042 B2 * 1/2017 Ksondzyk .............. G01N 27/22

FOREIGN PATENT DOCUMENTS

CN   202838286   3/2013
CN   202929595   5/2013
(Continued)

OTHER PUBLICATIONS

First Office Action for Chinese Patent Application No. 201610007258.3 dated Nov. 17, 2017.
(Continued)

*Primary Examiner* — Jonathan Boyd
(74) *Attorney, Agent, or Firm* — Calfee, Halter & Griswold LLP

(57) ABSTRACT

A touch substrate includes a substrate and a first touch electrode pattern and a second touch electrode pattern formed in a same layer on the substrate; each of the second touch electrodes includes body portions and a projecting portion, the projecting portion of each of the second touch electrodes is correspondingly fitted into a void in the first touch electrode pattern; and the first touch electrode pattern further includes a projecting portion which is disposed at an end portion and connected to one body portion of the first touch electrode at the end portion, a void corresponding to the projecting portion of the first touch electrode pattern is formed in the body portion of the second touch electrode at
(Continued)

the end portion, and the projecting portion of the first touch electrode pattern is fitted into this void.

18 Claims, 3 Drawing Sheets

(56) References Cited

FOREIGN PATENT DOCUMENTS

| CN | 104137042 A | 11/2014 |
|---|---|---|
| CN | 104182104 A | 12/2014 |
| CN | 104461202 A | 3/2015 |
| CN | 105549787 | 5/2016 |
| CN | 205281455 U | 6/2016 |

OTHER PUBLICATIONS

Written Opinion of the International Searching Authority to corresponding PCT application No. PCT/CN2016/091828, dated Nov. 9, 2016, 14 pages.

* cited by examiner

TOUCH SUBSTRATE, METHOD FOR MANUFACTURING THE SAME AND TOUCH DEVICE

CROSS-REFERENCE TO RELATED APPLICATIONS

The present application is based on International Application No. PCT/CN2016/091828, filed on Jul. 27, 2016, which is based upon and claims priority to Chinese Patent Application No. 201610007258.3, filed on Jan. 6, 2016, and the entire contents thereof are incorporated herein by reference.

TECHNICAL FIELD

The present disclosure relates to the technical field of touch, and more particularly to a touch substrate, a method for manufacturing the same, and a touch device.

BACKGROUND

In order to reduce the thickness of a display device, there has been proposed in the related art a touch device of which emitting electrode pattern and receiving electrode pattern are formed in a same layer. When a finger touches the corresponding area, the capacitance between the emitting electrode pattern and the receiving electrode pattern changes, resulting in a change in the detected current. However, in the edge region of the display device, the capacitive coupling area between the receiving electrode pattern and the emitting electrode is small, which is disadvantageous in providing sensitive touch.

It should be noted that, information disclosed in the above background portion is provided only for better understanding of the background of the present disclosure, and thus it may contain information that does not form the prior art known by those ordinary skilled in the art.

SUMMARY

An object of the present disclosure is to solve the above technical problems.

According to a first aspect, the present disclosure provides a touch substrate, comprising: a substrate; and a first touch electrode pattern and a second touch electrode pattern formed in a same layer on the substrate;

the first touch electrode pattern comprises a plurality of first touch electrodes, each of the first touch electrodes comprises two strip-like body portions and one strip-like connecting portion, the two strip-like body portions are parallel to each other, the connecting portion is perpendicular to the two body portions, one end of the connecting portion is connected to the middle portion of one of the body portions and the other end of the connecting portion is connected to the middle portion of the other body portion, one of the body portions of one first touch electrode of two adjacent first touch electrodes is connected to the body portion which is in the other first touch electrode and located at the same side with said one of the body portions, and two adjacent connection portions in the first touch electrode pattern are located at different sides;

the second contact electrode pattern comprises a plurality of second touch electrodes, each of the second touch electrodes comprises body portions and a projecting portion, and the projecting portion of each of the second touch electrodes is correspondingly fitted into a void in the first touch electrode pattern; and the first touch electrode pattern further comprises a projecting portion which is disposed at an end portion and connected to one body portion of the first touch electrode at the end portion, a void corresponding to the projecting portion of the first touch electrode pattern is formed in the body portion of the second touch electrode at the end portion, and the projecting portion of the first touch electrode pattern is fitted into this void in the body portion of the second touch electrode at the end portion.

According to a second aspect, the present disclosure provides a method for manufacturing a touch substrate, comprising: forming a first touch electrode pattern and a second touch electrode pattern in a same layer on the substrate; wherein, the first touch electrode pattern comprises a plurality of first touch electrodes, each of the first touch electrodes comprises two strip-like body portions and one strip-like connecting portion, the two strip-like body portions are parallel to each other, the connecting portion is perpendicular to the two body portions, one end of the connecting portion is connected to the middle portion of one of the body portions and the other end of the connecting portion is connected to the middle portion of the other body portion, one of the body portions of one first touch electrode of two adjacent first touch electrodes is connected to the body portion which is in the other first touch electrode and located at the same side with said one of the body portions, and two adjacent connection portions in the first touch electrode pattern are located at different sides;

the second contact electrode pattern comprises a plurality of second touch electrodes, each of the second touch electrodes comprises body portions and a projecting portion, and the projecting portion of each of the second touch electrode is correspondingly fitted into a void in the first touch electrode pattern; and the first touch electrode patterns further comprise a projecting portion which is disposed at an end portion and connected to one body portion of the first touch electrode at the end portion, a void corresponding to the projecting portion of the first touch electrode pattern is formed in the body portion of the second touch electrode at the end portion, and the projecting portion of the first touch electrode pattern is fitted into this void in the body portion of the second touch electrode at the end portion.

According to a third aspect, the present disclosure provides a touch device comprising any one of the above described touch substrates.

DETAILED DESCRIPTION

Figure 1:
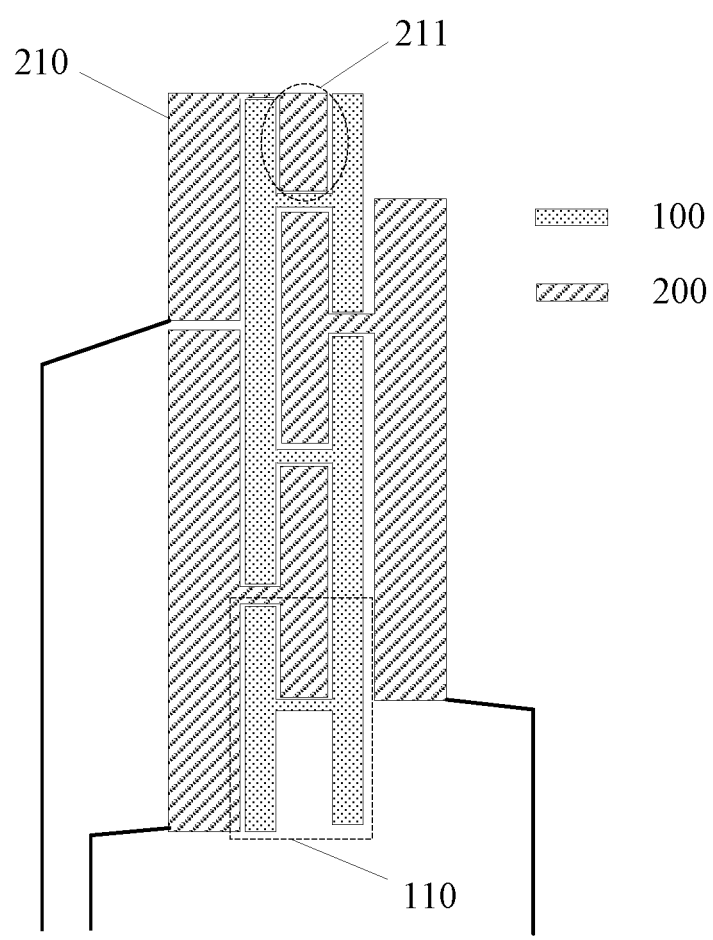
FIG. 1 is a schematic view showing a structure of a touch substrate in the related art.

Referring to FIG. 1, which is a schematic view showing a structure of an emitting electrode pattern and a receiving electrode pattern in a touch substrate in the related art, the touch substrate comprises a receiving electrode pattern 100 and an emitting electrode pattern 200. The receiving electrode pattern 100 comprises a plurality of aligned receiving electrodes 110. Two adjacent receiving electrodes 110 are connected to each other by their long sides on one side. Moreover, two adjacent connection portions in the receiving electrode pattern 100 are located at different sides so that a plurality of voids are defined in the receiving electrode pattern 100. Each of the emitting electrodes 210 in the emitting electrode pattern 200 has a projecting portion 211 which is fitted into the void in the receiving electrode pattern 100. This design allows the receiving electrode pattern 100 and the emitting electrode pattern 200 to have a larger capacitive coupling area, which contributes to improve touch sensitivity. In the structure shown in FIG. 1, the void defined in the receiving electrode pattern 100 located at an edge region is small, thus the capacitive coupling area of the receiving electrode pattern 100 and the emitting electrode 210 in this region is also small, which is disadvantageous in providing a good touch sensitivity.

Hereinafter, specific embodiments of the present disclosure will be described further with reference to the accompanying drawings and embodiments. The following embodiments are merely for illustrate the technical solutions of the present disclosure more clearly and are not intended to limit the scope of the present disclosure.

Figure 2:
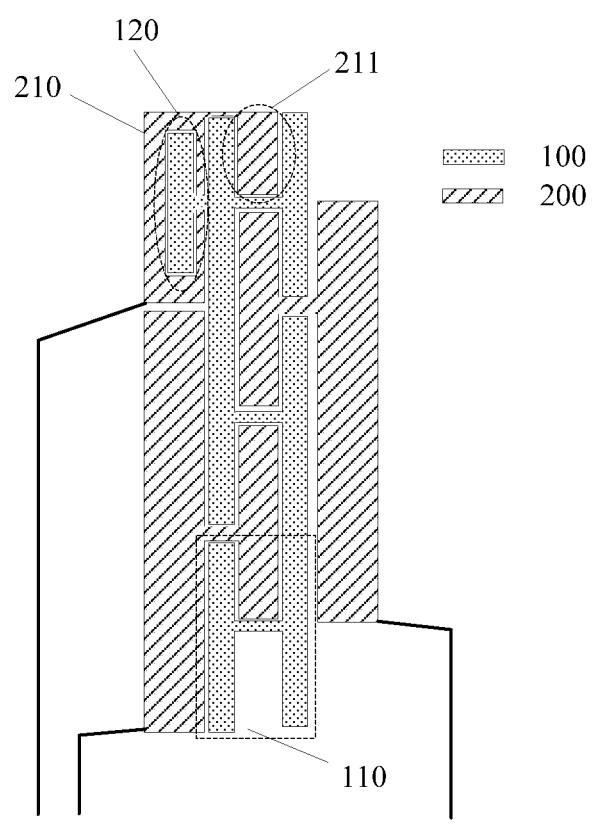
FIG. 2 is a schematic view showing a structure of a touch substrate according to an embodiment of the present disclosure.
Figure 3:
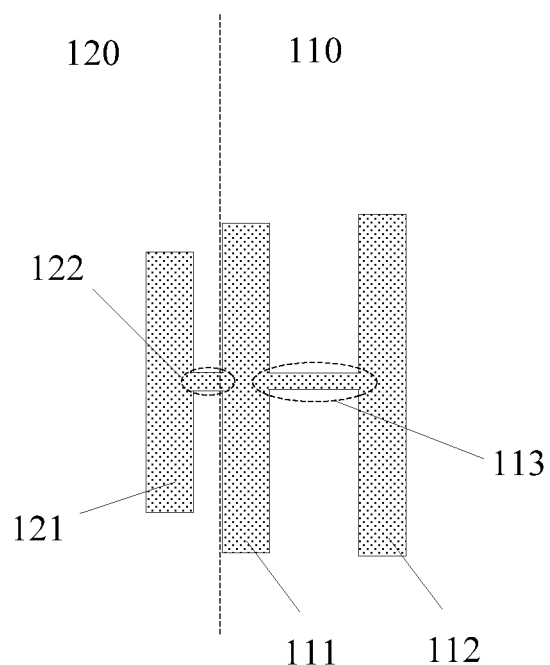
FIG. 3 is an enlarged schematic view showing a first touch electrode pattern at an end portion in FIG. 2.

Referring to FIG. 2, which is a schematic view showing the structure of a touch substrate according to an embodiment of the present disclosure, the touch substrate comprises a first touch electrode pattern 100 and a second touch electrode pattern 200. The first touch electrode pattern 100 comprises a plurality of touch electrodes 110 and projecting portions 120 located at an end portion. Referring to FIG. 3, which is a schematic view showing the first touch electrode pattern 100 at the end portion, the first touch electrode pattern 100 at the end portion comprises one first touch electrode 110 and one projecting portion 120. The first touch electrode 110 comprises two strip-like body portions 111 and 112 and one strip-like connecting portion 113. The two strip-like body portions 111 and 112 are parallel to each other. The connecting portion 113 is perpendicular to the two body portions 111 and 112. One end of the connecting portion 113 is connected to the middle portion of the body portion 111. The other end of the connecting portion 113 is connected to the middle portion of the body portion 112. One of the body portions of one first touch electrode 110 of two adjacent first touch electrodes 110 is connected to the body portion which is in the other first touch electrode 100 and located at the same side with said one of the body portions. Moreover, two adjacent connection portions in the first touch electrode pattern 100 are located at different sides. For example, as shown in FIG. 2, the body portion at the left side of the first one of the first touch electrodes from the upper side is connected to the body portion also at the left side of the second one of the first touch electrodes 110. The body portion at the right side of the second one of the first touch electrodes 110 is connected to the body portion also at the right side of the third one of the first touch electrodes 110. The two adjacent connecting portions are located at different sides.

The second touch electrode pattern 200 comprises a plurality of second touch electrodes 210, each of the second touch electrodes 210 comprises body portions and a projecting portion 211. The projecting portion 211 of each of the second touch electrode 210 is correspondingly fitted into a void in the first touch electrode pattern 100.

The projecting portion 120 of the first touch electrode pattern 100 is disposed at an end portion and connected to one body portion of the first touch electrode 110 at the end portion. A void corresponding to the projecting portion 120 of the first touch electrode pattern 100 is formed in the body portion of the second touch electrode 210 at the end portion. The projecting portion 120 of the first touch electrode pattern 100 is fitted into this void.

Referring to FIGS. 2 and 3, according to the touch substrate provided by the present disclosure, as the first touch electrode 110 at an edge position in the touch region has an additional projecting portion 120, and this projecting portion 120 is fitted into the body portion of the second touch electrode 210 at an end portion (that is the edge position in the touch region), the coupling area of the first touch electrode pattern 100 and the second touch electrode pattern 200 can be increased, which contributes to improve the sensitivity of touch detection in this region.

In the specific implementation, the first touch electrode pattern 100 herein can be an emitting electrode pattern. In this case, the second touch electrode pattern 200 can be a receiving electrode pattern. Alternatively, the second touch electrode pattern 200 herein can be an emitting electrode pattern. The first touch electrode pattern 100 herein can be a receiving electrode pattern.

In the specific implementation, the first touch electrode pattern 100 and the second touch electrode pattern 200 can be formed during the same process. This reduces the difficulty of making the touch device and helps to reduce the thickness of the corresponding touch device.

In the specific implementation, the first touch electrode pattern and the second touch electrode pattern can be formed of a transparent material such as indium tin oxide.

In the specific implementation, referring to FIGS. 2 and 3, the projecting portion 120 in the first touch electrode pattern 100 herein comprises a first portion 121 and a second portion 122. The first portion 121 is parallel to the body portion 111 of the first touch electrode 110 to which the projecting portion 120 is connected. The second portion 122 connects the first portion 121 and the first touch electrode 110.

This design allows the coupling area of the first touch electrode pattern 100 and the second touch electrode pattern 200 to be larger, further improving the touch sensitivity in the region. In the specific implementation, the basic purpose of the present disclosure can also be achieved with the above-described projecting portion 120 having other shapes. The corresponding technical solution should fall within the scope of the present disclosure.

In the specific implementation, the above-described touch substrate may further comprise an electrode protection layer formed over the first touch electrode pattern 100 and the second touch electrode pattern 200.

Thereby the first touch electrode pattern and the second touch electrode pattern can be effectively protected from being scratched in the later process of manufacturing and using. In the specific implementation, the electrode protection layer herein may be made of insulating material such as silicon nitride.

According to another aspect, the present disclosure provides a method for manufacturing a touch substrate, which can be used to manufacture the above described touch substrate, and the method comprises the following steps.

In step S1, a first touch electrode pattern and a second touch electrode pattern are formed on the same layer on the substrate. The formed first touch electrode pattern comprises a plurality of first touch electrodes. Each of the first touch electrodes comprises two strip-like body portions and one strip-like connecting portion. The two strip-like body portions are parallel to each other. The connecting portion is perpendicular to the two body portions. One end of the connecting portion is connected to the middle portion of one of the body portions and the other end of the connecting portion is connected to the middle portion of the other body portion. One of the body portions of one first touch electrode of two adjacent first touch electrodes is connected to the body portion which is in the other first touch electrode and located at the same side with said one of the body portions, and two adjacent connection portions in the first touch electrode pattern are located at different sides. The formed second contact electrode pattern comprises a plurality of second touch electrodes. Each of the second touch electrodes comprises body portions and a projecting portion. The projecting portion of each of the second touch electrodes is correspondingly fitted into a void in the first touch electrode pattern. The formed first touch electrode pattern further comprises a projecting portion which is disposed at an end portion and connected to one body portion of the first touch electrode at the end portion. A void corresponding to the projecting portion of the first touch electrode pattern is formed in the body portion of the second touch electrode at the end portion. The projecting portion of the first touch electrode pattern is fitted into this void.

In the specific implementation, the formed first touch electrode pattern herein can be an emitting electrode pattern. The formed second touch electrode pattern can be a receiving electrode pattern. Alternatively, the formed second touch electrode pattern herein can be an emitting electrode pattern. The formed first touch electrode pattern can be a receiving electrode pattern.

In the specific implementation, the above described step S1 may specifically comprise:

the first touch electrode pattern and the second touch electrode pattern are formed during the same process.

Specifically, the layer of the touch electrode material may be deposited by magnetron sputtering and the deposited layer of the touch electrode material may be patterned. The first touch electrode pattern and the second touch electrode pattern may be simultaneously formed in a one-time patterning process.

In the specific implementation, the projecting portion in the first touch electrode pattern may comprise a first portion and a second portion. The first portion is parallel to the body portion of the first touch electrode to which the projecting portion is connected. The second portion connects the first portion and the first touch electrode.

In the specific implementation, the above described method may further comprise: in step S2, an electrode protection layer are formed over the first touch electrode pattern and the second touch electrode pattern.

According to yet another aspect, the present disclosure provides a touch device, which comprises the above described touch substrates.

The touch device can be an electronic paper, a mobile phone, a tablet computer, a navigator and any other product or component with a touch function.

The above described contents are merely preferred embodiments of the present disclosure and it should be noted that it will be apparent to those skilled in the art that certain alterations and modifications may be made without departing from the principles of the present disclosure, and such alterations and modifications should also be regarded as the protection scope of the present disclosure.

What is claimed is:
1. A touch substrate, comprising:
   a substrate; and
   a first touch electrode pattern and a second touch electrode pattern formed in a same layer on the substrate; wherein,
   the first touch electrode pattern comprises a plurality of first touch electrodes, each of the first touch electrodes comprises two strip-like body portions and one strip-like connecting portion, the two strip-like body portions are parallel to each other, the connecting portion is perpendicular to the two strip-like body portions, one end of the connecting portion is connected to the middle portion of one of the two strip-like body portions and the other end of the connecting portion is connected to the middle portion of the other of the two strip-like body portions, one of the body portions of one first touch electrode of two adjacent first touch electrodes is connected to the body portion which is in the other first touch electrode and located at the same side with said one of the body portions, and two adjacent connection portions in the first touch electrode pattern are located at different sides;
   the second contact electrode pattern comprises a plurality of second touch electrodes, each of the second touch electrodes comprises body portions and a projecting portion, and the projecting portion of each of the second touch electrodes is correspondingly fitted into a void in the first touch electrode pattern; and
   the first touch electrode pattern further comprises a projecting portion which is disposed at an end portion and connected to one body portion of the first touch electrode at the end portion, a void corresponding to the projecting portion of the first touch electrode pattern is formed in the body portion of the second touch electrode at the end portion, and the projecting portion of the first touch electrode pattern is fitted into this void in the body portion of the second touch electrode at the end portion.

2. The touch substrate of claim 1, wherein the first touch electrode pattern is an emitting electrode pattern, and the second touch electrode pattern is a receiving electrode pattern.

3. The touch substrate of claim 1, wherein the second touch electrode pattern is an emitting electrode pattern, and the first touch electrode pattern is a receiving electrode pattern.

4. The touch substrate of claim 1, wherein the first touch electrode pattern and the second touch electrode pattern are formed during the same process.

5. The touch substrate of claim 1, wherein the projecting portion in the first touch electrode pattern comprises a first portion and a second portion, the first portion is parallel to the body portion of the first touch electrode which is connected to the projecting portion in the first touch electrode pattern and is disposed at the end portion, and the second portion connects the first portion and the first touch electrode at the end portion.

6. The touch substrate of claim 1 further comprising an electrode protection layer formed over the first touch electrode pattern and the second touch electrode pattern.

7. A method for manufacturing a touch substrate, comprising: forming a first touch electrode pattern and a second touch electrode pattern in a same layer on the substrate; wherein,
   the first touch electrode pattern comprises a plurality of first touch electrodes, each of the first touch electrodes comprises two strip-like body portions and one strip-like connecting portion, the two strip-like body portions are parallel to each other, the connecting portion is perpendicular to the two strip-like body portions, one end of the connecting portion is connected to the middle portion of one of the two strip-like body portions and the other end of the connecting portion is connected to the middle portion of the other of the two strip-like body portions, one of the body portions of one first touch electrode of two adjacent first touch electrodes is connected to the body portion which is in the other first touch electrode and located at the same side with said one of the body portions, and two adjacent connection portions in the first touch electrode pattern are located at different sides;

the second contact electrode pattern comprises a plurality of second touch electrodes, each of the second touch electrodes comprises body portions and a projecting portion, and the projecting portion of each of the second touch electrode is correspondingly fitted into a void in the first touch electrode pattern; and the first touch electrode pattern further comprises a projecting portion which is disposed at an end portion and connected to one body portion of the first touch electrode at the end portion, a void corresponding to the projecting portion of the first touch electrode pattern is formed in the body portion of the second touch electrode at the end portion, and the projecting portion of the first touch electrode pattern is fitted into this void in the body portion of the second touch electrode at the end portion.

8. The method of claim 7, wherein the first touch electrode pattern is an emitting electrode pattern, and the second touch electrode pattern is a receiving electrode pattern.

9. The method of claim 8, wherein the second touch electrode pattern is an emitting electrode pattern, and the first touch electrode pattern is a receiving electrode pattern.

10. The method of claim 7, wherein the step of forming the first touch electrode pattern and the second touch electrode pattern in a same layer on the substrate comprising: forming the first touch electrode pattern and the second touch electrode pattern during the same process.

11. The method of claim 7, wherein the projecting portion in the first touch electrode pattern comprises a first portion and a second portion, the first portion is parallel to the body portion of the first touch electrode which is connected to the projecting portion in the first touch electrode pattern and is disposed at the end portion, and the second portion connects the first portion and the first touch electrode at the end portion.

12. The method of claim 7 further comprising: forming an electrode protection layer over the first touch electrode pattern and the second touch electrode pattern.

13. A touch device, comprising a touch substrate which comprises:
a substrate; and
a first touch electrode pattern and a second touch electrode pattern formed in a same layer on the substrate; wherein, the first touch electrode pattern comprises a plurality of first touch electrodes, each of the first touch electrodes comprises two strip-like body portions and one strip-like connecting portion, the two strip-like body portions are parallel to each other, the connecting portion is perpendicular to the two strip-like body portions, one end of the connecting portion is connected to the middle portion of one of the two strip-like body portions and the other end of the connecting portion is connected to the middle portion of the other of the two strip-like body portions, one of the body portions of one first touch electrode of two adjacent first touch electrodes is connected to the body portion which is in the other first touch electrode and located at the same side with said one of the body portions, and two adjacent connection portions in the first touch electrode pattern are located at different sides;

the second contact electrode pattern comprises a plurality of second touch electrodes, each of the second touch electrodes comprises body portions and a projecting portion, and the projecting portion of each of the second touch electrodes is correspondingly fitted into a void in the first touch electrode pattern; and the first touch electrode pattern further comprises a projecting portion which is disposed at an end portion and connected to one body portion of the first touch electrode at the end portion, a void corresponding to the projecting portion of the first touch electrode pattern is formed in the body portion of the second touch electrode at the end portion, and the projecting portion of the first touch electrode pattern is fitted into this void in the body portion of the second touch electrode at the end portion.

14. The touch device of claim 13, wherein the first touch electrode pattern is an emitting electrode pattern, and the second touch electrode pattern is a receiving electrode pattern.

15. The touch device of claim 13, wherein the second touch electrode pattern is an emitting electrode pattern, and the first touch electrode pattern is a receiving electrode pattern.

16. The touch device of claim 13, wherein the first touch electrode pattern and the second touch electrode pattern are formed during the same process.

17. The touch device of claim 13, wherein the projecting portion in the first touch electrode pattern comprises a first portion and a second portion, the first portion is parallel to the body portion of the first touch electrode which is connected to the projecting portion in the first touch electrode pattern and is disposed at the end portion, and the second portion connects the first portion and the first touch electrode at the end portion.

18. The touch substrate of claim 13 further comprising an electrode protection layer formed over the first touch electrode pattern and the second touch electrode pattern.

* * * * *